March 26, 1963 K. G. HIGHLEY 3,082,897
CLIP FASTENER
Original Filed June 4, 1956 2 Sheets-Sheet 1
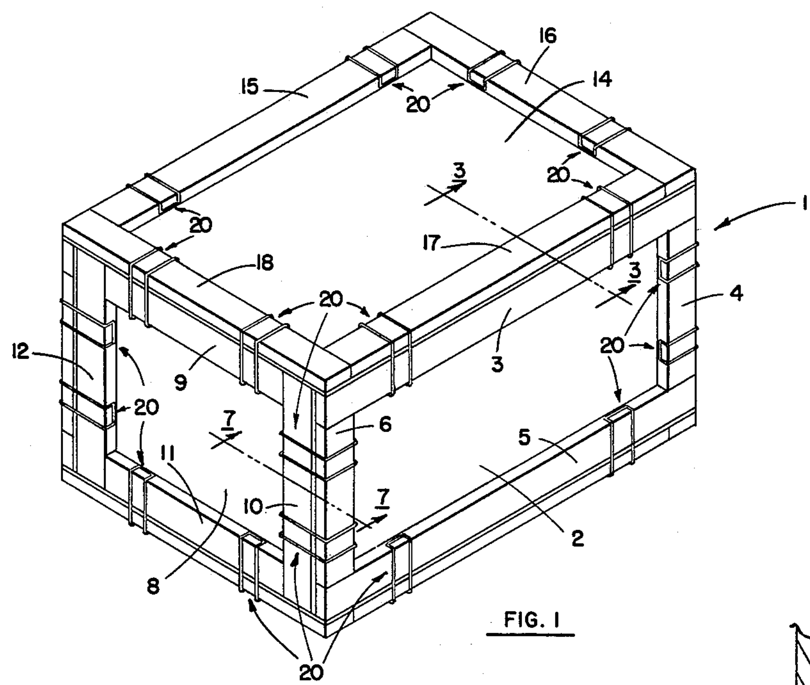
FIG. 1
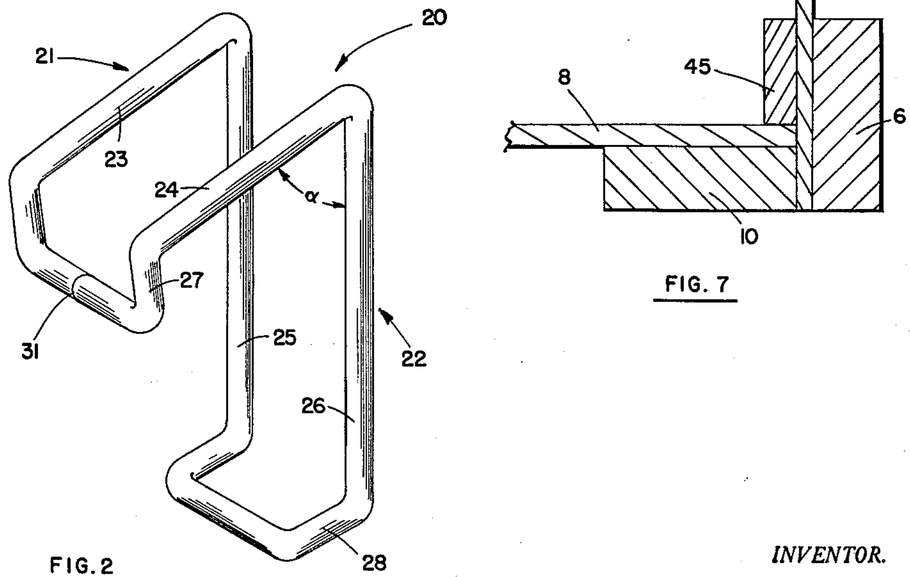
FIG. 7
FIG. 2
*INVENTOR.*
KENNETH G. HIGHLEY
*BY* William R. Lane
ATTORNEY March 26, 1963 K. G. HIGHLEY 3,082,897

CLIP FASTENER

Original Filed June 4, 1956 2 Sheets-Sheet 2

INVENTOR.
KENNETH G. HIGHLEY
BY
William R. Lane
ATTORNEY 3,082,897

CLIP FASTENER

Kenneth G. Highley, Torrance, Calif., assignor to North American Aviation, Inc.
Continuation of application Ser. No. 589,295, June 4, 1956. This application Mar. 29, 1960, Ser. No. 18,449
2 Claims. (Cl. 217—65)

This invention pertains to a clip fastener and more particularly to a fastening means for securing together panels having cleats on the edges thereof.

This application is a continuation of my copending application Serial No. 589,295, filed June 4, 1956 and now abandoned.

The development of this invention is particularly usable with a type of box construction which has now gone in wide use for shipping and storage containers. These structures include a relatively thin panel of plywood or other suitable material to which are attached wooden cleats around the peripheral edge. Customarily these cleated panels are arranged to form a box, being held together by means of nails in the cleats. Sometimes when access to the interior of the box is required, hinges and catches are screwed to certain of the panels to form a door section.

It is inherent in a design of this type that removal of contents from the box entails destruction of the box so that the components thereof must be scrapped. Removal of nails from the cleats results in breakage and splitting of the cleats and panel members. In fact, splitting of the cleats often occurs as the panels are nailed together. The provision of a hinged panel sacrifices strength in the box, is expensive and time consuming to install and does not allow access to all sides of the contents of the box. The time involved in nailing together the box panels and in removing the nails is also excessive. A nailed box often fails during rough handling due to the relatively slight holding power of the nails used in fastening the device together. Inspection of the contents of a nailed box is not practical because of the time involved in panel removal, and the resulting damage which generally precludes reassembly. It is recognized that various other fastening arrangements have been proposed in the past, but these have not been sufficiently successful to go into general use. Such designs usually included a nail-like projection to be driven into the wood of the box regardless of the particular form of the fastening device. As a result, the basic problems of re-use of the panels and the fasteners, together with the excessive time for assembly and removal, remained.

It is accordingly an object of this invention to provide a fastening arrangement overcoming the above enumerated difficulties.

Another object of this invention is to provide a fastening device which is re-usable and which will cause no damage to the panels secured so that they also may be reassembled and re-used.

A further object of this invention is to provide a fastening device having greater strength than a nailed connection.

Yet another object of this invention is to provide a fastening device which saves time both in assembly and disassembly of the members connected.

A still further object of this invention is to provide a fastening device permitting box panels to be stored flat prior to assembly.

An additional object of this invention is to provide a fastening device which permits inspection of the contents of the box and allows removal and repair of damaged panels.

Another object of this invention is to provide a fastening device which eliminates the need for nails, screws, hinges, latches or the like.

These and other objects will become apparent from the following detailed description taken in connection with the accompanying drawings, in which:

FIG. 1 is a perspective view of a box secured together by the fastening means of this invention;

FIG. 2 is an enlarged perspective view of the fastening device of this invention;

FIG. 7 is a cross sectional view taken along lines 7—7 in FIG. 1.

Figure 3:
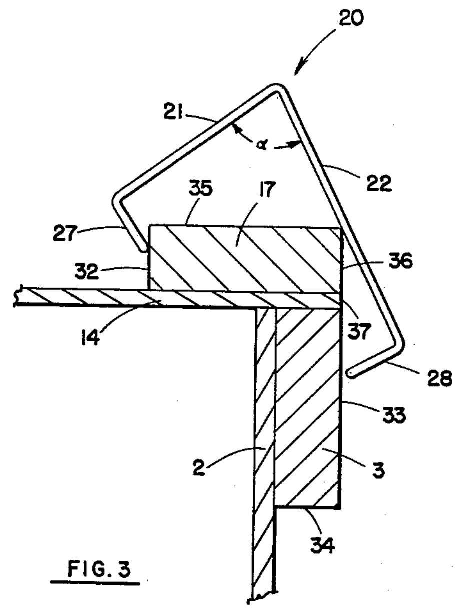
FIG. 3 is a sectional view taken along lines 3—3 of FIG. 1 but with the fastening clip only partially installed.

Referring to FIG. 1 of the drawing, there may be seen a box 1 formed of panels having cleats on the marginal edges thereof. Thus, for example, as illustrated, side panel 2 is provided with cleats 3, 4, 5 and 6 extending around the marginal portion of the outer surface thereof. These cleats may be glued, nailed or otherwise suitably fastened to the panel. Panel 2 is connected to side panel 8, the latter being provided with cleats 9, 10, 11 and 12. Likewise top panel 14 has cleats 15, 16, 17 and 18 around its periphery. The cleated portions of these panels are in abutting, overlapping engagement with the panels and the cleats at substantially 90° to each other at the edges. The other panels of the box are similarly arranged, the entire box being held together by clips 20 of this invention. In the example illustrated, two clips are employed along each edge of the box and replace the nails which would customarily have formed the attaching medium. The exact number of clips employed depends upon the sizes of the various panels and the loads to which they will be subjected.

Referring now to FIG. 2, the enlarged detail arrangement of the clip fastener may be seen. In the preferred embodiment clip 20 comprises spring wire in a continuous loop having a substantially L-shaped contour. Two leg portions 21 and 22 define the L-shaped loop, these being made up of spaced parallel wires 23—24 and 25—26, respectively. Tabs 27 and 28 extend inwardly from the two leg portions, each projecting in the general direction of the adjacent leg of the clip. The tabs are preferably at right angles to the legs with which they are connected. The angle $\alpha$ between the legs of the clip is an acute angle, in the preferred embodiment being substantially 80°. For ease in manufacture the loop of the clip is split, this preferably being at 31 on tab 27 where the split will not weaken the holding power of the clip.

Figure 4:
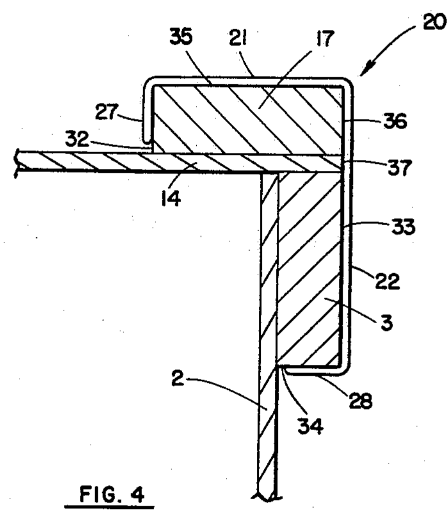
FIG. 4 is a sectional view similar to FIG. 3 after installation of the clip.

The clip is installed over abutting cleated portions of the panel as shown in FIGS. 3 and 4. The initial step as indicated in FIG. 3 is to dispose the clip with tab 27 over edge 32 of cleat 17, and tab 28 of the clip adjacent the outer surface 33 of cleat 3. A single blow with a hammer-like tool on leg 21 drives the clip onto the cleats to the position of FIG. 5. Here tabs 27 and 28 are in engagement with sides 32 and 34 of the cleats, respectively. Leg 21 abuts outer surface 35 of cleat 17, while leg 22 engages edge 36 of that cleat, edge 37 of panel 14 and surface 33 of cleat 3. The fact that angle $\alpha$ between the legs of the clip is less than the 90° angle between the cleat surfaces engaged by the clip means that a positive gripping force is exerted by the clip on the cleats. This precludes sliding of the clip along the cleats even during rough handling. A relatively large surface area is engaged by the clip which means that a considerable frictional force is present in resisting such movement of the clip.

It is preferred that the length of leg 21 is substantially the same as the width of cleat 17 so that the clip will fit readily on the cleat without damage thereto and with a relatively large surface engagement. Similarly, leg 22 is substantially the combined distance of the width of cleat 3, the thickness of panel 14 and the thickness of cleat 17. Of course, tabs 27 and 28 must be no longer than the thickness of the cleats so that the clip may fit properly thereon without interference with the panels.

The result of this design is a fastening device having many advantages. The clip will absorb loads applied in all directions having much greater holding power than a nailed construction. For example, tests have indicated that for a gamma wire clip of 8½ gage, the holding power in tension is 3,300 pounds. The nominal holding power of a nail for this type of installation is 100 pounds. Thus, a single clip is the equivalent in tension of 33 nails. While nails must rely upon their frictional engagement with the cleats into which they are driven for their holding power, the clips take full advantage of the entire cross-sectional strength of the clip material. Despite this tremendous advantage in strength, the clip is easily installed with one hammer blow and will not cause damage to the panels of the box. Removal of the clip may be easily effected by prying upwardly on tab 27 with a claw-like tool. Again, the panel will not be harmed so that the panel members may be used over and over for various box assemblies. Likewise, the clips may be re-used although their simple design means that replacement will not be a significant item of cost. Thus, by the use of the clips, an entire box assembly may be held together by members which are quickly installed or removed so that the contents of the box may be inspected or removed therefrom. A much stronger construction is obtained and use of expensive hinges, screws or latches is avoided. If one panel of a box becomes damaged, it simply may be removed and a new panel clipped into place. For storage purposes, the various panels of the box may be stored flat and assembled at will to any size box desired, depending upon the panels used.

An important advantage results from the increased tension-resisting force of the clip fastener by the materially improved column strength resulting from the cleated abutting panel edges. In many instances, heavily loaded boxes are stacked in warehouses, one on top of the other. This imposes a large compression load on the cleated portions of the boxes. With a nailed construction, and the relatively weak holding power obtained therefrom, these loads may separate the box edges, bowing the cleats outwardly. When so separated and independently loaded, the column strength of the cleats is greatly reduced. With the clips of this invention, however, the cleats are held firmly in abutting engagement so that together they define an L column having a radius of gyration greater than the two members separately, and therefore increased column strength.

Figure 5:
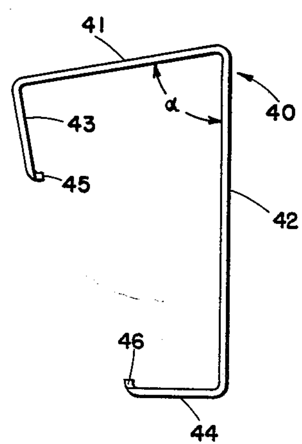
FIG. 5 is a side elevational view of a modified form of the clip fastener.
Figure 6:
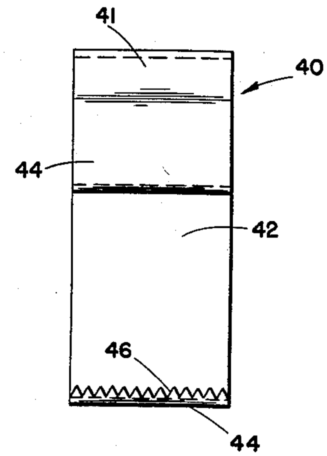
FIG. 6 is an end elevational view of the arrangement of FIG. 5.

A modified form of this invention may be seen in FIGS. 5 and 6. Here, instead of the wire construction, the clip is formed of a spring strap member 40 having legs 41 and 42 with depending tabs 43 and 44, respectively. The attachment and removal of the modified clip form is essentially the same as for that of the previously described embodiment. The tabs may include inclined end portions 45 and 46 which are serrated to form rows of teeth to increase the gripping power of the clip on the cleats. However, this modified design has less resistance in bending than the wire clip. Likewise, the strap type clip, by presenting relatively thin side edges, will more easily engage objects during handling of the container which might pry the clip loose from the cleats. The rounded form of the wires will tend to deflect such objects.

When the entire box assembly is secured by clips, it may be noted that the overlapping arrangement of the panels provides no means for resisting forces tending to push the end panels inwardly. The mutually contacting panel edges take care of such forces for the other panels of the box. For the end panels it is merely necessary to provide a batten 45 along the inner surfaces of the adjoining panels as shown in FIG. 7. As illustrated, batten 45, which need not be as heavy as the cleats, is provided along the inner margin of panel 2 for engagement with the inner surface of end panel 8.

From the foregoing it is apparent that I have provided an improved clip fastener having considerable advantage over prior art arrangements. It is essential that the member be of spring material and it should have a generally L-shape with less angle between the legs of the clip than the angle between the cleat surfaces to be engaged. This provides a positive gripping force which positions the clip along the cleats preventing displacement thereof. The tabs at the end of the legs are preferably at 90° thereto. In other words, the tabs are at an angle with respect to the legs of the clip corresponding to the angle between the sides of the cleats and their outer surfaces. This design assures that a maximum amount of surface engagement is obtained between the clip and the cleats.

It is, of course, obvious that the basic fastener design is applicable to constructions wherein other types of raised bead portions are provided around the exteriors of adjoining members. It is not necessary that the precise cleat form illustrated be employed by the panels to be secured, but the basic design principles of this invention may be employed in providing a clip for other adjoining beaded members encountered. It is further apparent that the entire panel assembly need not be held together by the clips of this invention, but only one or more as desired.

The foregoing detailed description is to be understood as given by way of illustration and example, the spirit and scope of this invention being limited only by the appended claims.

I claim:

1. In combination with adjoining angularly displaced abutting members, each of which is provided with a cleat along the outer marginal surface thereof, the edges of said members being disposed in an overlapping relationship with the outer edge of a first cleat and first member abutting the inner marginal surface of the second member on the side thereof remote from the cleat thereon, said cleats having angularly displaced outer surfaces with the outer surface of the cleat on said first member, the end of said second member and the outer edge of the cleat on said second member falling substantially in a single plane and presenting a common surface, a corner fastener device securely attaching together said abutting members comprising a substantially L-shaped resilient spring member having two legs, said legs each including a duality of wires in spaced parallelism, the first of said legs having a length which is substantially the width of and in juxtaposition with said common surface, the second of said legs having a length which is substantially the width of and in juxtaposition with the outer surface of the cleat on said second member; a depending tab portion on the end of each of said legs extending inwardly substantially normal to its associated leg on the side thereof adjacent the other leg, the tab portion on said first leg being no greater in length than the thickness of the cleat on said first member and in juxtaposition with the inner edge of said first member cleat, and the tab portion on said second leg being no greater in length than the thickness of the cleat on said second member and in juxtaposition with the inner edge of said second member cleat, one of said tab portions including a continuous transverse portion extending across and interconnecting the spaced parallel wire outer ends of such tab portion, the other of said depending tab portions including non-continuous transverse portions extending across and substantially closing the gap between the spaced parallel wire outer ends of such tab portion to form a substantially closed loop corner fastener, said legs having a relative angular displacement less than that of the angularly disposed outer surfaces of said first and second cleats when said spring member is removed therefrom whereby the spring member exerts a continuous gripping force on said cleats to securely hold said abutting members together in a substantially fixed rigid relationship and to position the spring member on said cleats.

2. A substantially closed-loop spring wire corner fastener for securing together two angularly displaced abutting members having cleats along the outer marginal surfaces thereof comprising a pair of spatially displaced substantially L-shaped parallel resilient wire members, each of said members including a pair of leg portions acutely angularly disposed relative one to the other; a depending portion at the end of each of said leg portions extending inwardly substantially normal to its associated leg portion on the side thereof adjacent the other leg portion and having a length no greater than the thickness of the cleat with which it is to be operatively associated; a continuous transverse portion extending normally across and interconnecting the outer ends of the depending portions at one adjacent end of the wire members; and non-continuous transverse portions extending normally from the outer end of each of the depending portions at the other adjacent end of the wire members, said non-continuous transverse portions extending toward each other to substantially close the gap between said spatially displaced parallel wire members to form a substantially closed-loop spring wire corner fastener for installation on the cleats of the angularly displaced abutting members whereby said leg portions will exert an inwardly directed continuous spring force thereby causing each of said depending portions to forcefully grip the edge of the cleat with which it is operatively associated to hold the abutting members in a substantially fixed rigid relationship.

References Cited in the file of this patent

UNITED STATES PATENTS

| | | |
|---|---|---|
| 129,713 | Cadwell et al. | July 23, 1872 |
| 638,821 | Sylvester | Dec. 12, 1899 |
| 669,728 | Heagerty | Mar. 12, 1901 |
| 1,962,452 | Martin | June 12, 1934 |
| 2,003,856 | Gimbel | June 4, 1935 |
| 2,006,657 | Smith | July 2, 1935 |
| 2,334,240 | Bockhouse | Nov. 16, 1943 |
| 2,597,342 | Lang | May 20, 1952 |

FOREIGN PATENTS

| | | |
|---|---|---|
| 279,844 | Italy | Nov. 22, 1930 |